United States Patent [19]

Nishimura

[11] Patent Number: 4,816,219

[45] Date of Patent: Mar. 28, 1989

[54] LOW-TEMPERATURE SOLDER COMPOSITION

[75] Inventor: Tetsuro Nishimura, Tokyo, Japan

[73] Assignee: Nihon Speriasha Co., Ltd., Hyogo, Japan

[21] Appl. No.: 61,220

[22] Filed: Jun. 12, 1987

[30] Foreign Application Priority Data

Jul. 18, 1986 [JP] Japan ................................ 61-170260
Dec. 17, 1986 [JP] Japan ................................ 61-302353

[51] Int. Cl.$^4$ .............................................. C22C 30/04
[52] U.S. Cl. ..................................... 420/589; 420/570; 420/571
[58] Field of Search ........................ 420/570, 571, 589

[56] References Cited

U.S. PATENT DOCUMENTS

| | | | |
|---|---|---|---|
| 2,220,961 | 11/1940 | Kern ..................................... | 420/566 |
| 2,595,925 | 5/1952 | Carlson et al. ....................... | 420/580 |
| 4,491,562 | 1/1985 | Soga et al. ........................... | 420/589 |

FOREIGN PATENT DOCUMENTS

| | | | |
|---|---|---|---|
| 0449238 | 6/1948 | Canada ............................... | 420/571 |
| 0153857 | 9/1984 | Japan .................................. | 420/589 |
| 0000118 | 8/1914 | United Kingdom ................ | 420/570 |

OTHER PUBLICATIONS

Metal Progress, May 1932, p. 65.
"Indalloy Specialty Solders", pp. 11, Indium Corporation of America, 1979.

Primary Examiner—L. Dewayne Rutledge
Assistant Examiner—David W. Schumaker
Attorney, Agent, or Firm—Larson and Taylor

[57] ABSTRACT

A conventional solder composition of Sn—Bi—Pb which is improved so that, when soldering job at a lower temperature, adequate adhesion strength and a resilient bond is obtained by virtue of additional incorporation of 0.005 to 1% GA and/or 0.01 to 0.1% Ni. The inventive solder is useful in assembly work in the electronic industry wherein thermally weak parts are subjected to soldering.

8 Claims, No Drawings

LOW-TEMPERATURE SOLDER COMPOSITION

FIELD OF INVENTION

This invention relates to a solder composition based on a tin (Sn) - bismuth (Bi) - lead (Pb) system featuring a low melting temperature up to 150° C. More particularly, this invention relates to a solder composition comprising Sn, Bi and Pb as major constituents and a minor amount of gallium (Ga) and/or nickel (Ni) as featuring components.

The inventive solder features low temperature workability and will readily flow into a space between an underlying workpiece (or a substrate) and an overlying workpiece to be adhered (or simply a workpiece) to form a strong adhesion of the workpiece on the substrate.

DESCRIPTION OF THE RELATED ART

Conventional solders consisting essentially of Sn and Pb have a melting temperature as high as about 183° C. and soldering irons were heated to a temperature of about 400° C. at the heating tip or the torch head so that solid solder may be melted to form a melt body or a liquid drop. In other words, conventionally, solders were subjected to melting or heating to considerably higher temperatures than the solder melt temperature in soldering jobs and this conventional condition was maintained not only in soldering by a manual iron, but also in recently developed soldering apparatus, wherein automated torch heads are arranged. That is, their heater heads or equivalent mechanical portions were operated in a conventional manner.

However, recently the electronic industry requires the soldering of thermally weak, small dimensional parts, wherein the heater t ips are not allowed to raise the temperature as high as done conventionally and the temperature is restricted to not higher than about 150° C. This restriction leads to mentioning that, for the part of the technical design of solders, a new solder should conform with such conditions that, at about 150° C., it can stay in a melted condition having flowability, viscosity and wettability comparable to conventional solder melt staying at conventional higher temperatures. On the other hand, soldered products are afterwards desired to have heat-resistivity. This situation leads to the conclusion that the new solder should desirably melt at about 100° C. and at about 150° C. it should have characteristics in the molten state comparable to conventional solders in the same molten state.

In view of such a demand as noted above, recently introduced low-temperature solders are mainly those featuring a Sn-Cd-Pb system incorporating cadmium (Cd) 5 to 15% (% herein and below indicates weight %, unless otherwise specified) into the conventional Sn-Pb system and those of a Sn-Bi-Pb system incorporating bismuth (Bi) 10 to 60% in place of Cd as noted above.

However, the Sn-Cd-Pb system has demerits in cost as well as harm against human bodies, in spite of acceptable adhesion. As for the Sn-Bi-Pb system, the present inventors actually tested it in soldering electronic parts onto a copper plate substrate, wherein a bending test of the soldered samples caused definite cracks or delaminations on soldered spots, which proves that this type of solder composition is inferior to conventional solder compositions with respect to bending crack as well as adhesion strength.

Then, the present inventors observed flawed spots in detail and found that molten solder drops had not entered by flow or intruded enough into a space between the workpiece-to-be-adhered and the substrate and a solder layer had not been formed adequately therebetween.

These experiences lead to the conclusion that, because of poor flowability or poor wettability, the use of the Sn-Bi-Pb system requires screening with respect to shapes and material qualities of the workpieces and that the recently developed Sn-Bi-Pb system is limited to applications which are narrow in scope.

SUMMARY OF THE INVENTION

The primary object of the invention is to offer a solder composition which will melt up to 150° C. with good wettability of molten solder to a workpiece and thereby to render high adhesion with a solder spot.

Another object of the invention is to offer a low-temperature solder composition which will yield less oxidized by-product during a soldering operation.

A further object of the invention is to offer a solder composition which is suitable for soldering parts having relatively low heat-resistance and small dimensions, in particular, parts like those used in the electronic industry.

A still further object of the invention is to offer a solder composition which will be able to re-solder on a spot where soldering was previously conducted by the conventional Sn-Pb system having a relatively high soldering temperature, without the trouble of removing a solidified solder layer or body in re-soldering by using the inventive solder composition.

The present invention attains these and other objects by formulating a solder composition which comprises 25 to 35% of Sn, 25 to 35% of Bi, 0.005 to 1% of Ga, all in weight %, and balancing Pb or by a solder composition which comprises 25 to 35% of Sn, 25 to 35% of Bi, 0.005 to 1% of Ga, 0.01 to 0.1% of Ni, all in weight %, and balancing Pb.

DESCRIPTION OF THE PREFERRED EMBODIMENTS

Example 1

A low temperature solder composition which consists essentially of 28.5% of Sn, 28.5% of Bi, 0.1% of Ga and balancing Pb had a melting range of 96° to 134° C.

The solder composition as noted above was manufactured in a similar manner to that used to manufacture of conventional solders, of which the particulars are noted by way of illustration.

For instance, into a previously cleaned crucible a required amount of the metal Sn is placed and heated to 300 ° C. to melt in a furnace and then necessary amounts of the metals Ga, Bi and Pb are added in sequence to the crucible to melt together and the mixture is stirred sufficiently. Thereafter, the mixed melt is flown out into a mold to be molded to a desired shape.

Experimental soldering with use of the solder as noted above, with aid of a flux as specified below was conducted by soldering small electronic parts onto a copper plate (30 mm × 30 mm × 1 mm) as a substrate, in an electrical furnace having a regulated temperature of 155° ± 3° C., which conditions were assumed from manufacture of integrated circuit chips or boards in the industry.

Then, after allowing for cooling, bonded parts an plate assemblies were subjected to a bending test to known adhesion strength, which proved that, unlike conventional low-temperature solders, no flaw or defect was produced on the soldered spots.

This superior result is attained by improvement in wettability of the melt status of the invention solder composition, which was brought about by the incorporation of Ga into the formulation and actually it was visually observed that broader spread of the molten solder formed an ample solder layer. The bending test as noted above was conducted in the same way with soldered examples which will be described in the following.

In place of the electrical furnace as noted above, the use of a vapor heating system by means of a fluorinated solvent having a boiling point at 155° C. has proved equal attainment.

A composition of the flux applied in the above experiments is specified below:
WW rosin: 29.3%
Diisobutylamine itaconic acid salt: 8.0%
Diethyl aniline: 1.2%
Isopropyl alcohol: 60.0%
Benzotriazole: 1.5%

Example 2

A low-temperature solder composition having a melting range of 97° to 138° C. was obtained by formulating Sn 30.0%, Bi 34.8%, Ga 0.7% and phosphorus (P) 0.008% as antioxidant and balancing Pb.

This composition can be obtained in the same way as noted in the Example 1, however, because of the difficulty in melting P, it is recommended, as is known in the art, to prepare an alloy of P with Sn in advance, instead of adding P directly in the simple substance, and to add P in the form of the alloy with Sn.

The solder thus manufactured exhibited a positive characteristic in that oxidation of solder melt was inhibited due to addition of P and further the addition of Ga brought about improved wettability. Consequently observed were ample spread of solder melt on the substrate and quicker adhesion as well as a stronger bond.

Example 3

A low-temperature solder composition having a melting range of 97° to 138° C. was obtained by formulating Sn 30.0%, Bi 34.8%, Ga 0.7%, Ni 0.03% and calcium (Ca) 0.4% as antioxidant and balancing Pb. It is also recommended to prepare in advance an alloy of Ca with Pb to avoid difficult meltability with Ca in the case of a direct mix. This solder composition was improved similarly to the above examples, the solder improved in wettability due to addition of Ga and further improved in that the addition of Ni brought about formation of a finer crystalline structure with a solidified solder layer, by which a stronger bond and resistance to stress crack were obtained.

Example 4

A low temperature solder composition was obtained comprising Sn 34.8%, Bi 26.8%, Ga 0.006%, Ni 0.08% and the antioxidant of P 0.4% and Ca 0.03% and balancing Pb.

This composition proved advantageous in that by-product of oxides was definitely reduced due to addition of both P and Ca, which favorable enhanced effects brought by addition of Ga and Ni to render excellency in strength of adhesion, mechanical stress and the prevention of oxides.

The contents of Sn and Bi in the compositions noted above were determined to obtain desired melting temperatures relying on the phase diagram of the conventional Sn-Bi-Pb system.

As for Sn content, it was set in the range of 25 to 35% to give a melt temperature about 135° C. and as for Bi content, 35% was set as the upper limit, because over this % the adhesion strength was attenuated despite the additions of Ga and Ni, and then the lower limit 25% was set, because under that % the temperature range of the liquid phase or melting temperature rises sharply. Appropriate content of Ga is set in the range of 0.005 to 1% for the reason that under the lower limit of 0.005%, delamination trouble is not always avoided and that over 1% further progressive advantage is not found. As for Ni, content, under 0.01% the adhesion strength was attentuated, and then over 0.1% the melting temperature rises sharply. Finally, the above range was selected.

The content of the antioxidant, P or Ca, is limited to under 0.5%, because over such % further preventive effect against oxides is not brought about and, unfavorably, the adhesion strength tends to lower. The low-temperature solders as described above may be molded by means known in the art in the shape of a rod or stick and further in the form of a powder or cream.

In conclusion, the inventive solder compositions may be handled in applications in the same way as in the case of the conventional Sn-Bi-Pb system, and will give better wettability as well as a larger resilient bond, the accomplishments having been proved by superior resistance to cracking or delamination under the bending test and described hereinabove. Accordingly, the inventive low-temperature solder is suited to market applications wherein low-temperature solder service is required, in particular, assembly jobs in the electronics industry wherein thermally weak parts should be bonded.

I claim:

1. A low-temperature solder composition comprising 25 to 35% of Sn, 25 to 35% of Bi, 0.005 to 1% of Ga and balancing Pb.

2. A low-temperature solder composition as noted in claim 1, wherein an antioxidant is additionally contained in a range under 0.5%.

3. The invention of claim 2, wherein said antioxidant is phosphorus.

4. The invention of claim 2, wherein said antioxidant is calcium.

5. A low-temperature solder composition comprising 25 to 35% of Sn, 25 to 35% of Bi, 0.005 to 1% of Ga, 0.01 to 0.1% of Ni and balancing Pb.

6. A low-temperature solder composition as noted in claim 5, wherein an antioxidant is additionally contained in a range under 0.5%.

7. The invention of claim 6, wherein said antioxidant is phosphorus.

8. The invention of claim 6, wherein said antioxidant is calcium.

* * * * *